United States Patent [19]

Ueda

[11] Patent Number: 5,027,218
[45] Date of Patent: Jun. 25, 1991

[54] TELEVISION CAMERA HAVING CCD IMAGING DEVICE WITH DOUBLE LINE CCD SECTION FOR EACH VERTICAL CCD

[75] Inventor: Kazuhiko Ueda, Yokohama, Japan
[73] Assignee: Victor Company of Japan, Ltd., Japan
[21] Appl. No.: 331,120
[22] Filed: Mar. 31, 1989
[30] Foreign Application Priority Data Apr. 1, 1988 [JP] Japan ............................ 63-80756

[51] Int. Cl.$^5$ .............................................. H04N 3/14
[52] U.S. Cl. ............................ 358/213.23; 358/909; 358/213.26
[58] Field of Search .................. 358/213.23, 213.24, 358/909, 213.26, 213.27, 213.29

[56] References Cited

U.S. PATENT DOCUMENTS

| 4,336,556 | 6/1982 | Sekine et al. | 358/213.26 |
|---|---|---|---|
| 4,472,741 | 9/1984 | Takatsu et al. | 358/909 |
| 4,635,122 | 1/1987 | Kato et al. | 358/213.26 |
| 4,686,573 | 8/1987 | Murayama et al. | 358/213.29 |
| 4,807,037 | 2/1989 | Lesaka et al. | 358/213.26 |
| 4,837,630 | 6/1989 | Ueda et al. | 358/213.26 |

FOREIGN PATENT DOCUMENTS 63-52591 3/1983 Japan .
59-122085 7/1984 Japan .............................. 358/213.29

*Primary Examiner*—Joseph A. Orsino
*Assistant Examiner*—Jill Jackson
*Attorney, Agent, or Firm*—Lowe, Price, LeBlanc, Becker & Shur

[57] ABSTRACT

A television camera has an imaging device and a drive circuit. The imaging device is an interline transfer CCD further having a storing section between column of vertical CCDs thereof and a horizontal CCD thereof. The storing section having first and second vertical CCDs for receiving charges from photodiodes via the vertical CCDs. The drive circuit reads out the charges generated at photodiodes such that during a vertical blanking period of a frame, charges at the horizontal odd lines of photodiodes are transferred in response to a V SYNC pulse are transferred to the second vertical CCDs via the first vertical CCDs; then charges at even lines are transferred similarly to the third vertical CCDs; and then horizontal CCD reads charges from the second and third vertical CCDs alternately. The video signal reproduced from a video tape where an object is recorded by a VTR using the video signal from the television camera can provide a frame still picture without double line image through a still image reproduction system if the object is moving between the two fields because two field is detected almost at the same time. The exposure time is controllable with a variable timer and charge sweep off circuit from zero to a frame interval as a maximum.

4 Claims, 14 Drawing Sheets (FRAME STILL IMAGE REPRODUCTION)

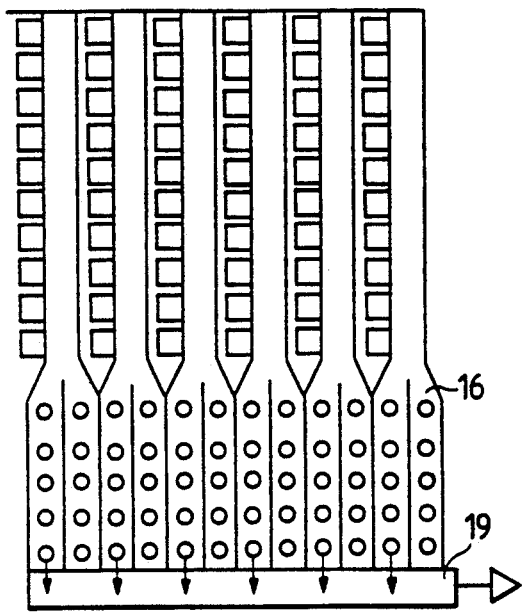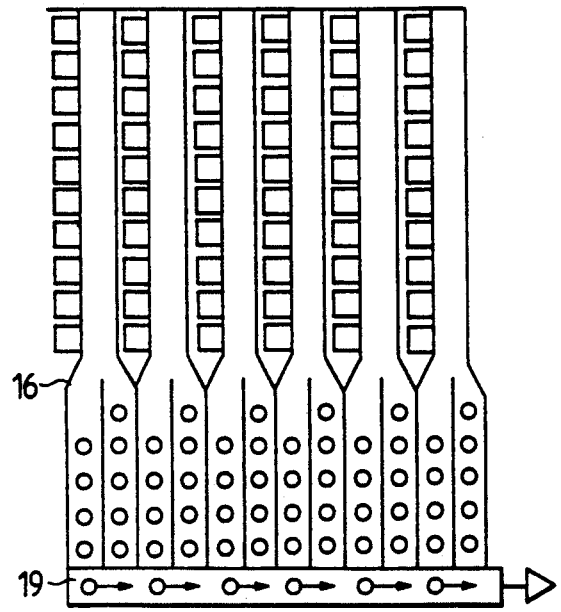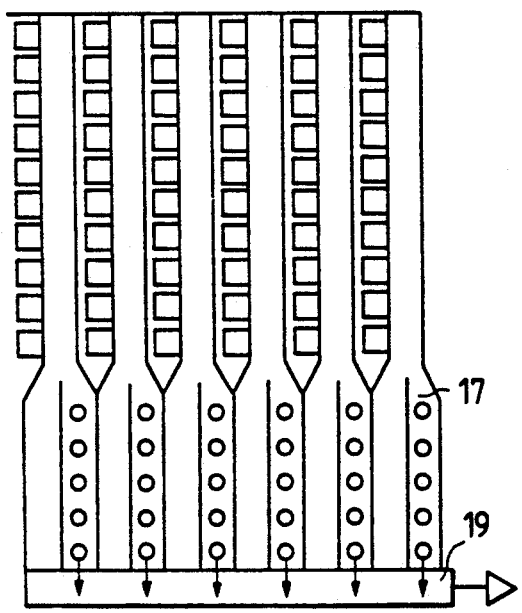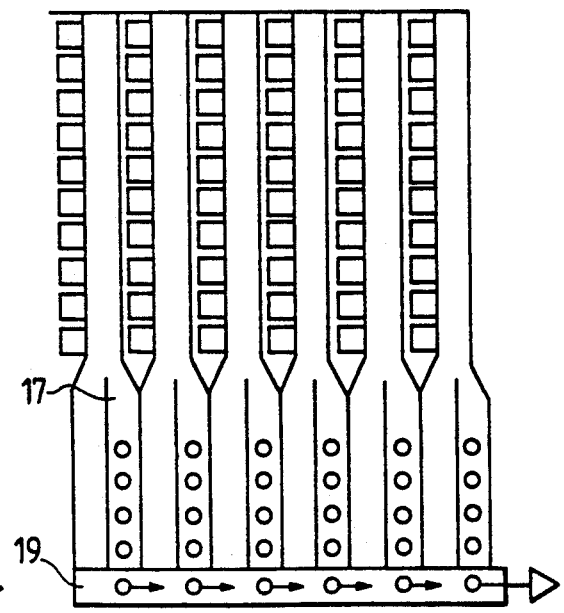

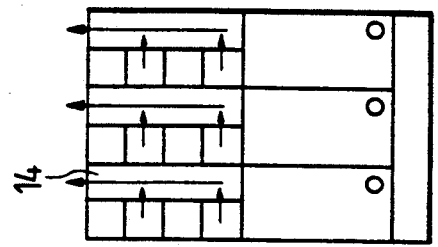
FIG. 13A
FIG. 13B
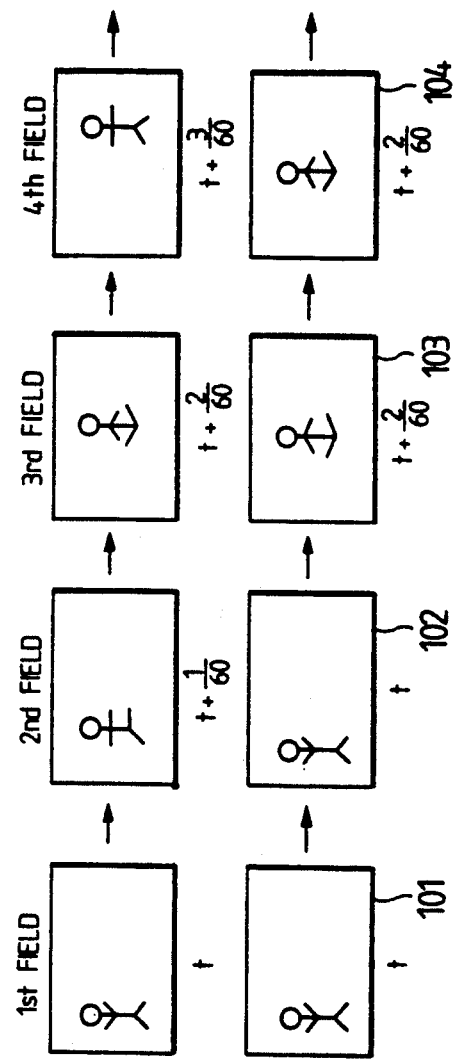
FIG. 16A PRIOR ART
CONVENTIONAL TYPE
FIG. 16B
ACCORDING TO THE INVENTION

ODD LINE READ MODE

ODD LINE SWEEP AWAY MODE

EVEN LINE READ MODE

EVEN LINE SWEEP AWAY MODE

TELEVISION CAMERA HAVING CCD IMAGING DEVICE WITH DOUBLE LINE CCD SECTION FOR EACH VERTICAL CCD

BACKGROUND OF THE INVENTION

1. Field of the Invention

This invention relates to a television camera and particularly to a television camera for producing a video signal suited for still picture reproduction.

2. Description of the Prior Art

Electronic still picture is reproduced by a display having a scan converter for forming a video signal indicative of still image from an NTSC (interlace type) video signal by storing a video signal of two fields, i.e., a frame; then repeatedly reading the stored video signal; and sending the video signal to a non-interlace TV monitor. An electronic still picture television system is shown in FIG. 17. In FIG. 17, a video image is recorded onto a video tape in the VTR 2 through a television camera 1 preferably having an electronic shutter. The television camera 1 may be built into the VTR 2 as a single unit VTR build-in type camera. The VTR 2 reproduces still image in a field still mode or a frame still mode. Reproduced still image is displayed on a display 3 or recorded as an electronic photograph, i.e., a hard copy of the still image by a printer 4. The display 3 comprises a scan converter 3a and a non-interlace type television receiver 3b. For convenient displaying, a general television receiver is usable.

In reproduction of an electronic still picture from the above prior art system, there is a drawback that the reproduced still image has lower vertical resolution than a photograph obtained by a conventional film with a photochemical process. One of the reasons is as follows:

In the conventional type still picture reproduction system of FIG. 17, which reproduces still picture from interlace type video signal of only one field of a frame (two fields) is recorded, so that the vertical resolution of the recorded still image is one half the vertical resolution of the normally displayed image of two complete fields. On the other hand, if still picture was produced from video signal of two fields which make up a frame of interlace scanning there would be a drawback that reproduced picture may exhibit a double line image as shown in FIG. 18 when an object moves in a short period of time between consecutive fields, though vertical resolution in this case would be the same as that of the normally displayed image of two complete fields.

SUMMARY OF THE INVENTION

The present invention has been developed in order to remove the above-described drawbacks on still picture image reproduction inherent to the conventional still picture television system.

According to the present invention there is provided a television camera comprising: an imaging device having: matrix photoelectric conversion elements for producing charges in response to incident light; columns of first vertical CCDs arranged in the main scanning direction for receiving the charges from the photoelectric conversion elements and for transferring the charges in response to a first signal; transfer means for transferring charges from horizontal odd lines of the photoelectric conversion elements to the first vertical CCDs in response to a second signal and for transferring charges from horizontal even lines of the photoelectric conversion elements to the first vertical CCDs in response to a third signal; a storing section arranged at one side of respective the column of first vertical CCDs, including a second vertical CCDs for receiving, storing and transferring, in response to a fourth signal, the charges fed from the horizontal odd lines of the photoelectric conversion elements via the first vertical CCDs and further including a third vertical CCDs for receiving, storing and transferring, in response to a fifth signal, the charges fed from the horizontal even lines of the photoelectric conversion elements via the first vertical CCDs; and a horizontal CCD arranged at one side of the second and third vertical CCDs for receiving the charges stored in the second and third vertical CCDs alternately and for outputting the charges sequentially in response to a horizontal blanking signal; and a drive circuit for repeatedly generating the first, second, third, fourth, and fifth signals, such that the second signal is generated in response to a vertical blanking signal; then the first and fourth signals are generated at the same time; then the third signal is generated; and then the first and fifth signals are generated at the same time.

BRIEF DESCRIPTION OF THE DRAWINGS

The object and features of the present invention will become more readily apparent from the following detailed description taken in conjunction with the accompanying drawings in which:

FIGS. 3A to 3H are schematic illustrations illustrating operation of the imaging device of FIG. 1;

FIGS. 13A and 13B are schematic illustrations illustrating operation of the second embodiment;

FIGS. 16A and 16B are schematic illustrations illustrating operation of still image reproduction of the prior art and according to the invention respectively;

The same or corresponding elements or parts are designated at like references throughout the drawings.

DETAILED DESCRIPTION OF THE INVENTION

Figure 1:
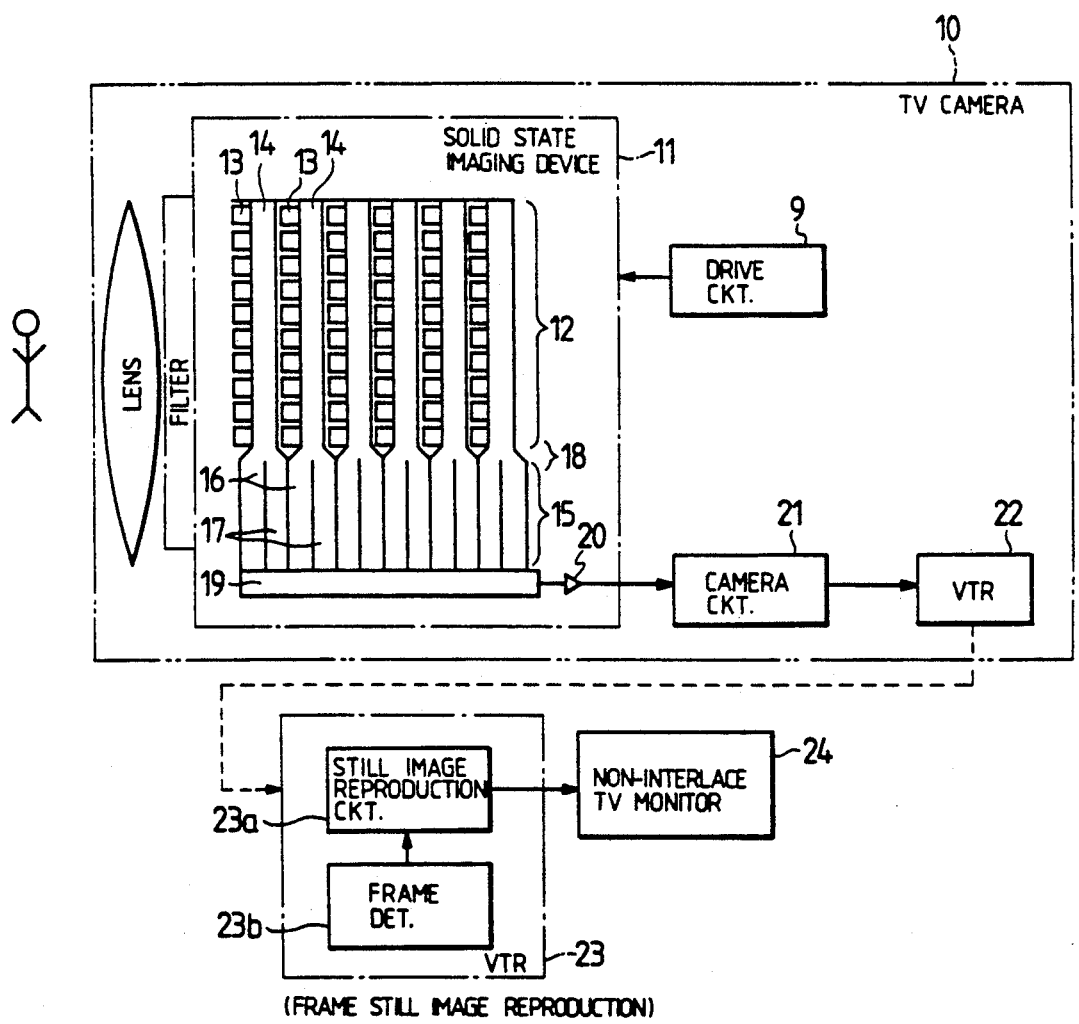
FIG. 1 is a block diagram of the first and second embodiments of the invention.

Referring now to the drawings, FIG. 1 shows a television camera for producing a video signal suited for reproducing still picture image of a first embodiment according to the invention.

In FIG. 1, a video signal read from a solid state imaging device 11 of a television camera 10 is sent to a camera circuit 21 for converting the video signal into an NTSC system composite video signal. The NTSC composite video signal is sent to a VTR 22 built in the camera 10 itself, being recorded therein in a serial signal form. The VTR 22 records the video signal onto a magnetic tape. The recorded magnetic tape is set into a VTR 23 which performs frame still reproducing. The VTR 23 reproduces a video signal for reproducing a still picture and sends it to a non-interlace television monitor 24 at every frame, containing complete first and second fields, in response to a frame signal detected by a frame detection circuit 23b.

With these operations the television monitor 24 displays the reproduced still image.

In FIG. 1 the television camera 10 has a solid state imaging device 11 comprising an image section 12 formed of photoelectric conversion elements 13 (photodiodes) and first vertical transfer CCDs 14 for transferring charges from the photodiodes 13, storage section 15 including second vertical CCDs 16 and third vertical CCDs 17 for receiving and storing charges from the image section 12, switch arrangement 18 for transferring the charges from the first vertical CCDs 14 to either CCDs 16 or CCDs 17 alternately, a horizontal transfer CCD. 19 for receiving and outputting charges from the storing section 15, and a floating diffusion type amplifier 20 (FDA) for amplifying a charge signal from the horizontal CCD 19. The imaging device 11 operates in response to drive signals from a driving circuit 9. The vertical transfer CCDs 14 are able to transfer charges at higher speed than the conventional type frame interline transfer CCD. Such operation is disclosed in the Japanese patent application No. 61-196933.

Figure 2A:
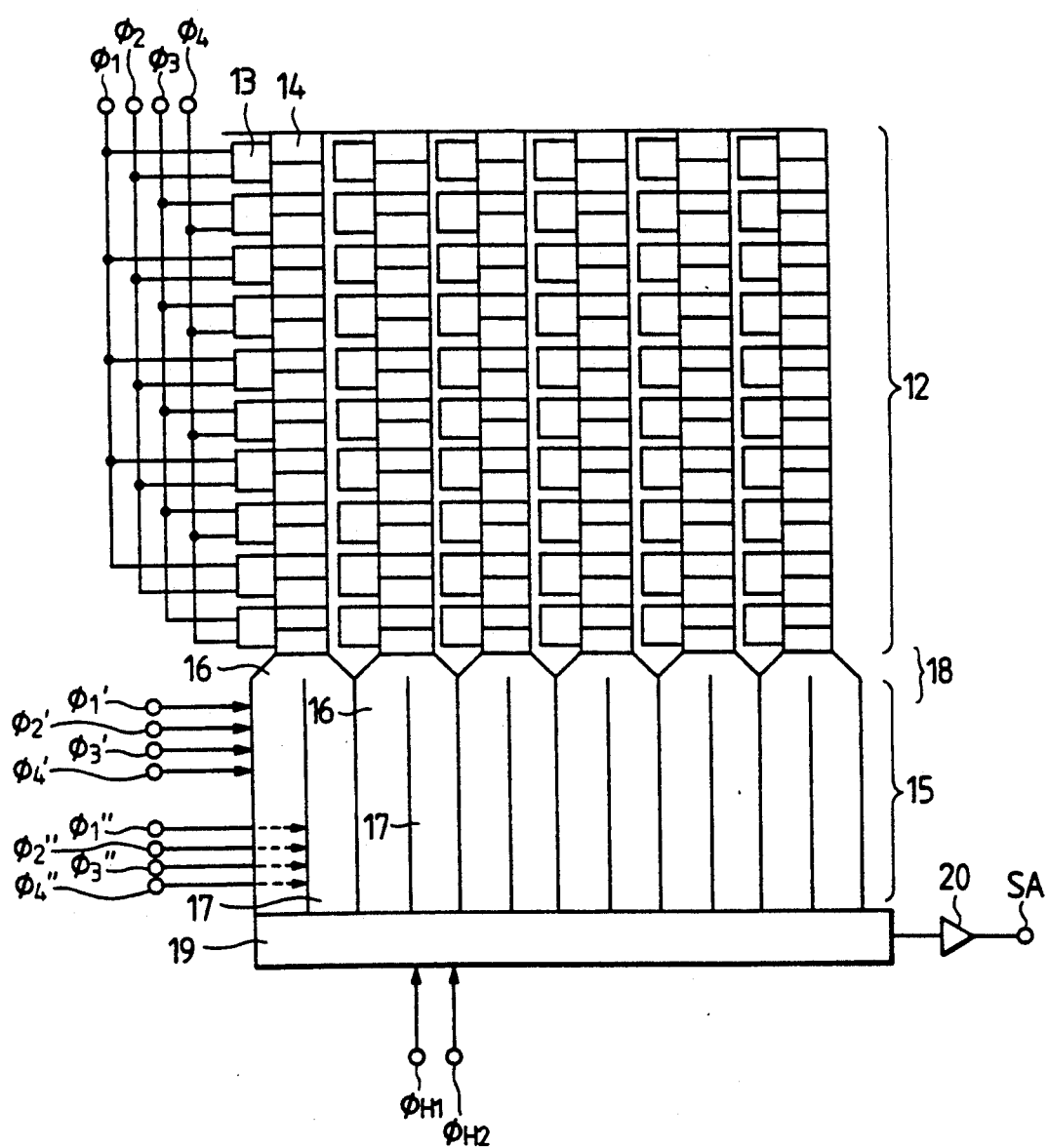
FIG. 2A is a schematic illustration of the imaging device of the first and second embodiments.

FIG. 2A shows drive signals for the imaging device 11 more specifically. In FIG. 2A, drive signals $\phi 1$, $\phi 2$ are applied to each of odd horizontal lines of CCD segments of the imaging section 12. Drive signals $\phi 3$, $\phi 4$ are applied to each of even horizontal lines of CCD segments of the imaging section 12. Drive signals $\phi 1'$, $\phi 2'$, $\phi 3'$, $\phi 4'$ are applied to each of second vertical CCDs 16. Drive signals $\phi 1''$, $\phi 2''$, $\phi 3''$, $\phi 4''$ are applied to each of third vertical CCDs 17. Drive signals $\phi H1$, $\phi H2$ are applied to a horizontal transfer CCD 19.

Figure 2C:
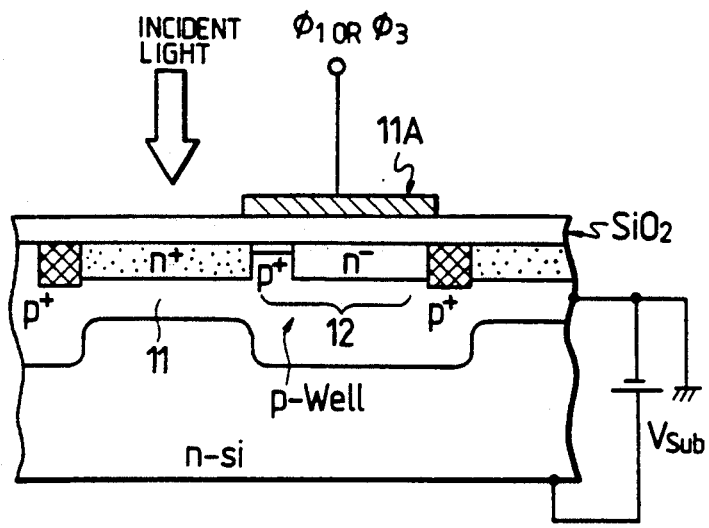
FIG. 2C is fragmentary cross-sectional view of the imaging device of FIG. 1.
Figure 2B:
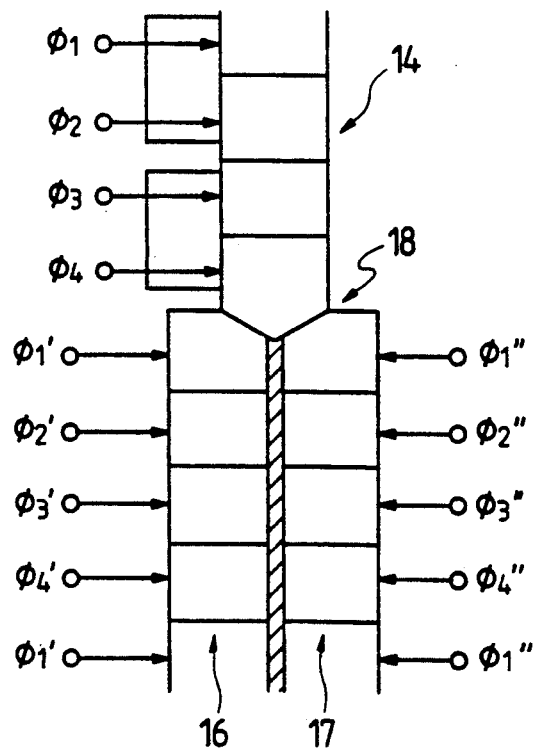
FIG. 2B is a schematic illustration of switch arrangement of the first and second embodiments.

FIG. 2B shows the switch arrangement 18. Each switch arrangement 18 is formed by the lower end segment of the first vertical CCD 14 and the upper end segments of the second and third vertical CCDs 16 and 17. Specifically, the lower end segments of the first vertical CCD 14 has right-hand and left-hand bottom edges directly coupled to tops of the upper end segments of the second and third vertical CCDs 16 and 17 respectively. Accordingly, charges can travel from the lower end segment of the first vertical CCD 14 to either of the upper end segments of the second and third vertical CCDs 16 and 17. When the drive signal $\phi 1''$ is at a low potential, charge transferring of charges from the first vertical CCDs 14 to the second vertical CCDs 16 is inhibited; when the drive signal $\phi 1'$ is at a low potential, charge transferring of charges from the first vertical CCDs 14 to the third vertical CCDs 17 is inhibited.

FIG. 2C shows a fragmentary vertical cross-sectional view of the imaging device. Electrode 11A transfers charges along the first vertical CCDs 14 as well as transfers a charge generated at a photoelectric conversion element in response to a gate pulse GPA or GPB shown in FIG. 5 which has higher potential than the vertical transfer signal.

FIGS. 3A to 3H schematically illustrate charge transferring of the imaging device 11. Hereinbelow will be described the operation with reference to FIGS. 2 and 3A to 3H.

Figure 3A:
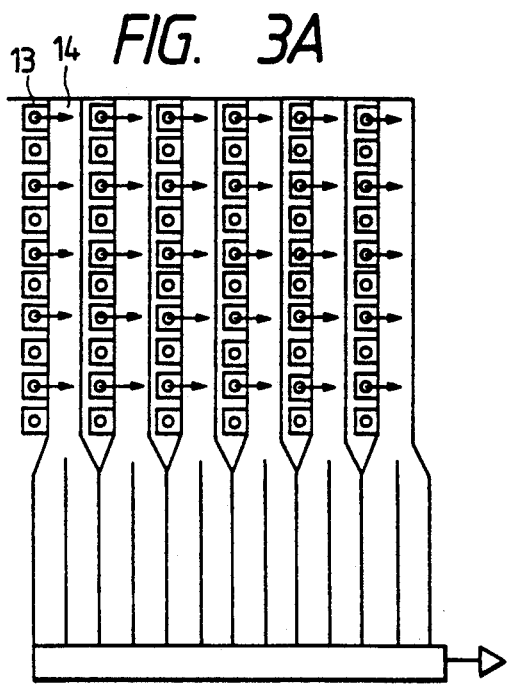
Figure 3B:
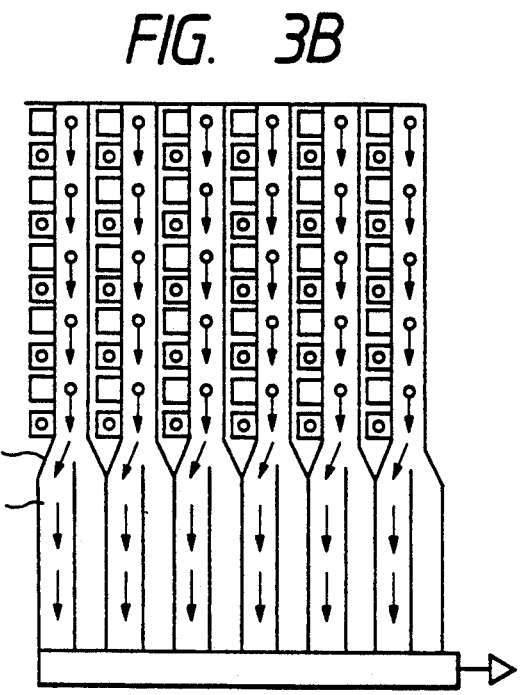
Figure 3C:
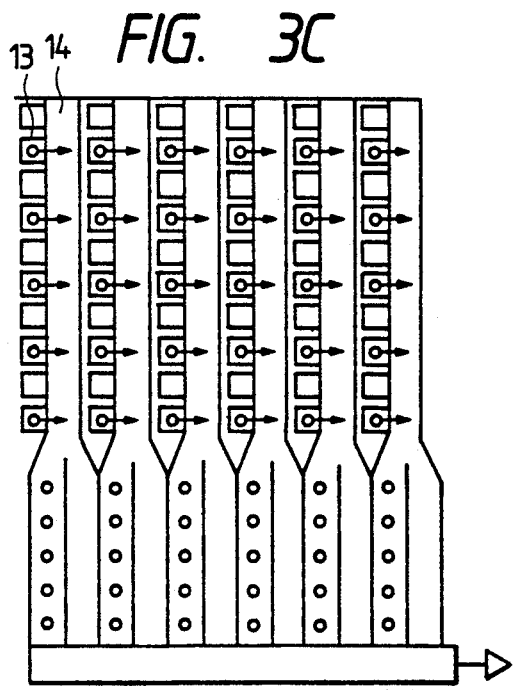
Figure 3D:
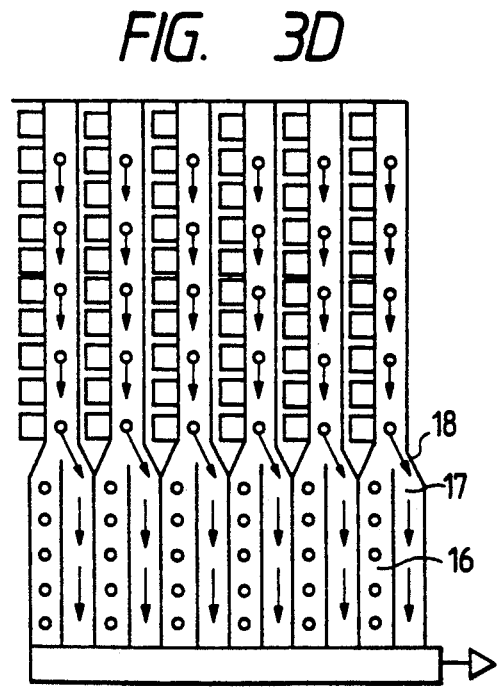
Figure 5:
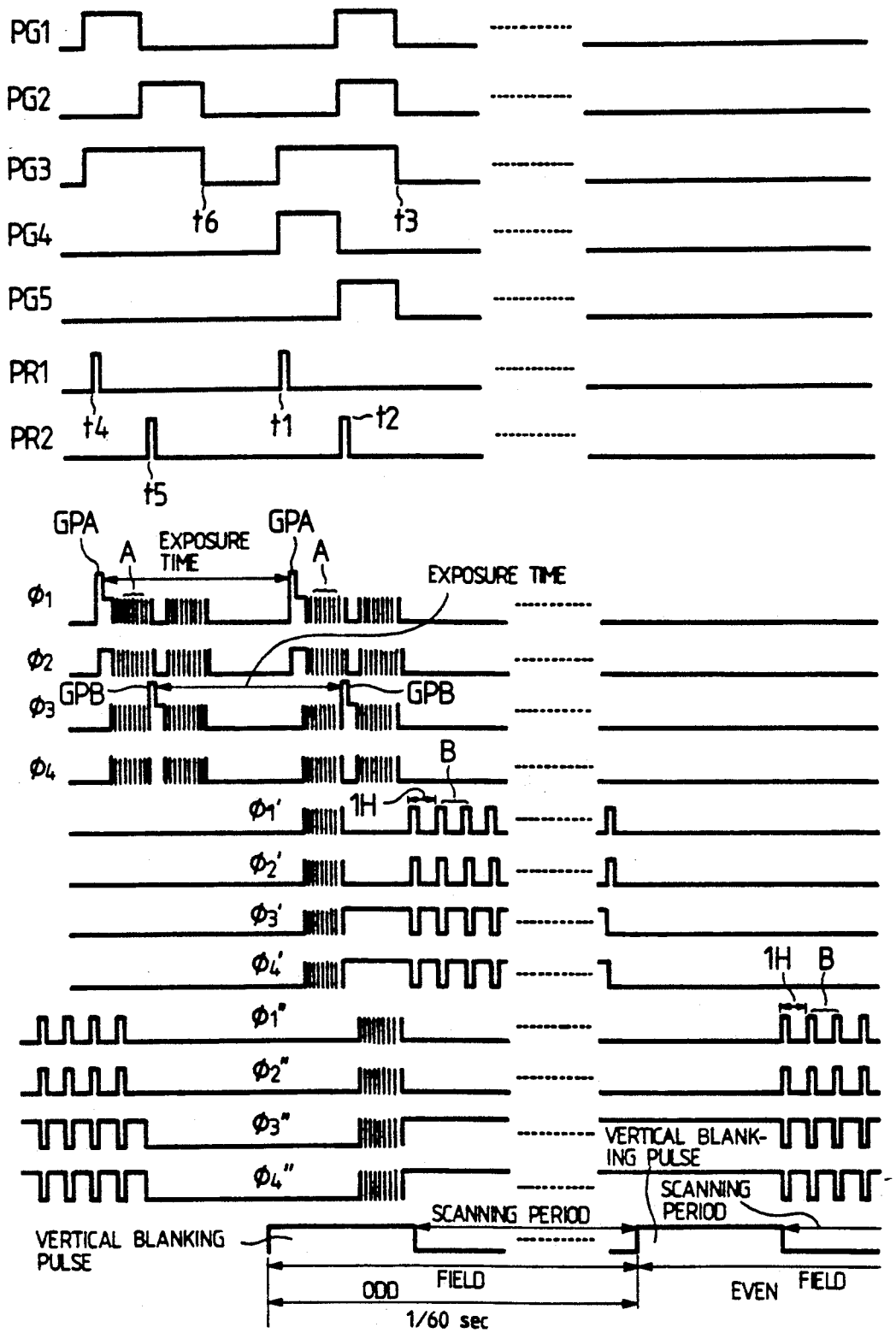
FIGS. 5 and 6 show waveforms for illustrating operation of the drive circuit of FIG. 1.

Charges generated for one frame interval by photodiodes 13 of horizontal odd line are transferred to the first vertical CCDs 14 during a vertical blanking period in response to a gate pulse GPA shown in FIG. 5 included in the drive signal $\phi 1$, as shown FIG. 3A. In FIG. 2A, charges in respective first vertical CCDs 14 are transferred in the vertical direction (downward of the drawing) transferred in response to the drive signals $\phi 1$, $\phi 2$, $\phi 3$, $\phi 4$ as well as charges at end segment of the first vertical CCDs 14 are received by the second vertical CCDs 16 through switch arrangements 18 and transferred vertically respectively in response to drive signals $\phi 1'$, $\phi 2'$, $\phi 3'$, $\phi 4'$, at a sufficiently higher frequency than frequency $f_H$ ($f_H$ is horizontal scanning frequency), as shown in FIG. 3B. Then, charges generated for one frame interval by photodiodes 13 of horizontal even lines are transferred to the first vertical CCDs 14 in response to a gate pulse GPB included in the drive signal $\phi 2$ shown in FIG. 5, as shown in FIG. 3C. Charges in respective first vertical CCDs 14 are transferred in the vertical direction (downward in the drawing) transferred in response to the drive signals $\phi 1'$, $\phi 2'$, $\phi 3'$, $\phi 4'$ as well as charges are received through switch arrangements 18 and transferred vertically by the third vertical CCDs 17 respectively in response to drive signals $\phi 1''$, $\phi 2''$ $\phi 3''$, $\phi 4''$, at a sufficiently higher frequency, as shown in FIG. 3D. The above-mentioned operation is done during a vertical blanking period. This causes charges generated by horizontal odd lines of imaging device to be stored in the second vertical CCDs 16; charges generated by horizontal even line, to be stored in the third vertical CCDs 17.

Then, for first field of scanning period, charges of odd horizontal lines stored in the second vertical CCDs 16 are transferred to the horizontal CCD 19 and read out, as shown in FIGS. 3E, and 3F. Then, for second field of scanning period, charges of even horizontal lines stored in the third vertical CCDs 17 are transferred to the horizontal CCD 19 and read out, as shown in FIG. 3G, and 3H. These operations are repeated at every two fields. The detected video signal is converted into a composite video signal of NTSC system which is recorded by the built-in VTR 22.

Frame still reproduction is done as follows:

A frame detection circuit 23b detects frames by detecting a vertical blanking signal reproduced from the magnetic tape in the conventional manner. The detected frames, for example, one combination of a first field 101 and a second field 102 and another combination of a third field 103 and a fourth field 104 are shown in FIG. 16B. The still image reproduction circuit 23a reproduces still image at the first field 101 and second field 102 which are obtained from the same picture image detected at "t". At the subsequent third and fourth fields 103, 104, the still image reproduction circuit 23a reproduces the same picture image detected at time (t+2/60). These operations are repeated at every two fields, i.e., every frame, to make still reproduction. This is referred to as frame still reproduction.

Therefore, the still image reproduction of recorded image according to the invention suffers from no deterioration of vertical resolution when compared with the prior art field still reproduction because reproduction of image is obtained from two successive fields, i.e., odd and even fields, which are indicative of the same image. Further, in the conventional frame still reproduction (two fields), a still image is formed from two different picture images of different times, for example, at "t" and (t+1/60), or at (t+2/60) and (t+3/60). Thus, it may have double line image. On the other hand, according to the invention, still image reproduction develops no double line image because the still image is reproduced from the same picture image of two successive fields having a negligibly short period of time therebetween.

As shown in FIGS. 16A and 16B, picture images at (t+1/60) and (t+3/60) are not recorded or not reproduced in this invention. However, this does not cause an adverse effect to visual sense of human being compared with deterioration of picture quality due to decrease of vertical resolution or double line image.

As shown in FIG. 16A, in the prior art, in order to prevent double line image, a television camera is required to shield the imaging device 11 from incident light at every even fields by a rotary shutter. Therefore, the maximum storage or charge time period for the photoelectric conversion elements will be 1/60 seconds. On the other hand, in the television camera 10 according to the invention the maximum storage time for the photoelectric conversion elements is 1/30 seconds. Therefore, the television camera 10 has higher sensitivity than the above-mentioned prior art television camera.

In addition to this feature, the television camera according to the invention has compatibility with the conventional video system because if video signal is read out by using only the second vertical CCDs 16, output video signal is the same as that obtained by the conventional type television camera. Therefore, the television camera according to the invention can output video signal in the manner shown in FIG. 16A.

Hereinbelow will be described the drive circuit 9.

Figure 4:
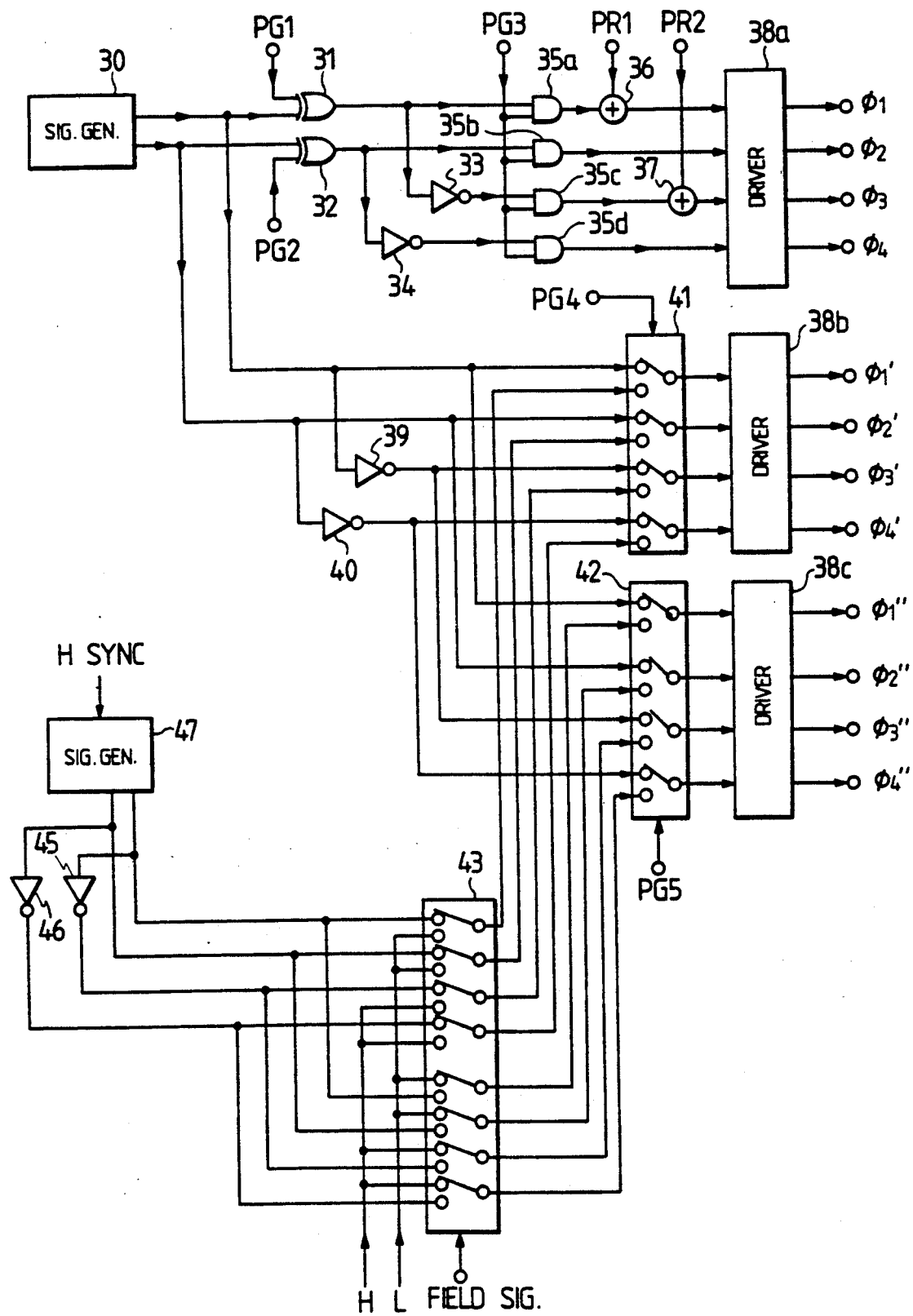
FIG. 4 is a block diagram of the drive circuit of FIG. 1.

FIG. 4 shows a block diagram of the drive circuit 9. In FIG. 4, a signal generator 30 produces four-phase signals. The four-phase signals are sent to driver 38a for producing drive signals $\phi1, \phi2, \phi3, \phi4$; to the driver 38b for producing drive signals $\phi1', \phi2', \phi3', \phi4'$; to the driver 38c for producing drive signals $\phi1'', \phi2'', \phi3'', \phi4''$. The drive signals $\phi1, \phi2, \phi3, \phi4$ drive the first vertical CCDs 14. The drive signals $\phi1', \phi2', \phi3', \phi4'$ drive the second vertical CCDs 16. The drive signals $\phi1'', \phi2'', \phi3'', \phi4''$ drive the third vertical CCDs 17. FIG. 5 shows these drive signals and timing signals for generating these drive signals. In FIG. 5, at t1, a signal PR1 is produced for generating gate pulse GPA by adding the signal PR1 to one of four-phase signals by an adder 36. The gate pulse GPA transfers charges generated at photodiodes 13 of odd lines to the first vertical CCDs 14, as shown in FIG. 3A. For interval between t1 and t2, four-phase signals are sent to the driver 38a by opening AND gates 35a, 35b, 35c, 35d in response to a signal PG3 and also sent to the driver 38b in response to a signal PG4 for generating drive signals $\phi1', \phi2', \phi3', \phi4'$. These signals transfer charges in the first vertical CCDs 14 to the second vertical CCDs 16, as shown in FIG. 3B. At t2, signal PR2 is produced for generating gate pulse GPB by adding signal PR2 to one of four-phase signals by an adder 37. The gate pulse GPB transfers charges generated at photodiodes 13 of even lines to the first vertical CCDs 14, as shown in FIG. 3A. For interval between t2 and t3, four-phase signals are sent to the driver 38a by opening AND gates 35a, 35b, 35c, 35d in response to a signal PG3 and also sent to the driver 38c in response to a signal PG5 for generating drive signals $\phi1'', \phi2'', \phi3'', \phi4''$. These signals transfer charges in the first vertical CCDs 14 to the third vertical CCDs 17, as shown in FIG. 3D. The above-mentioned operations are done during a vertical blanking period of only odd field.

Figure 6:
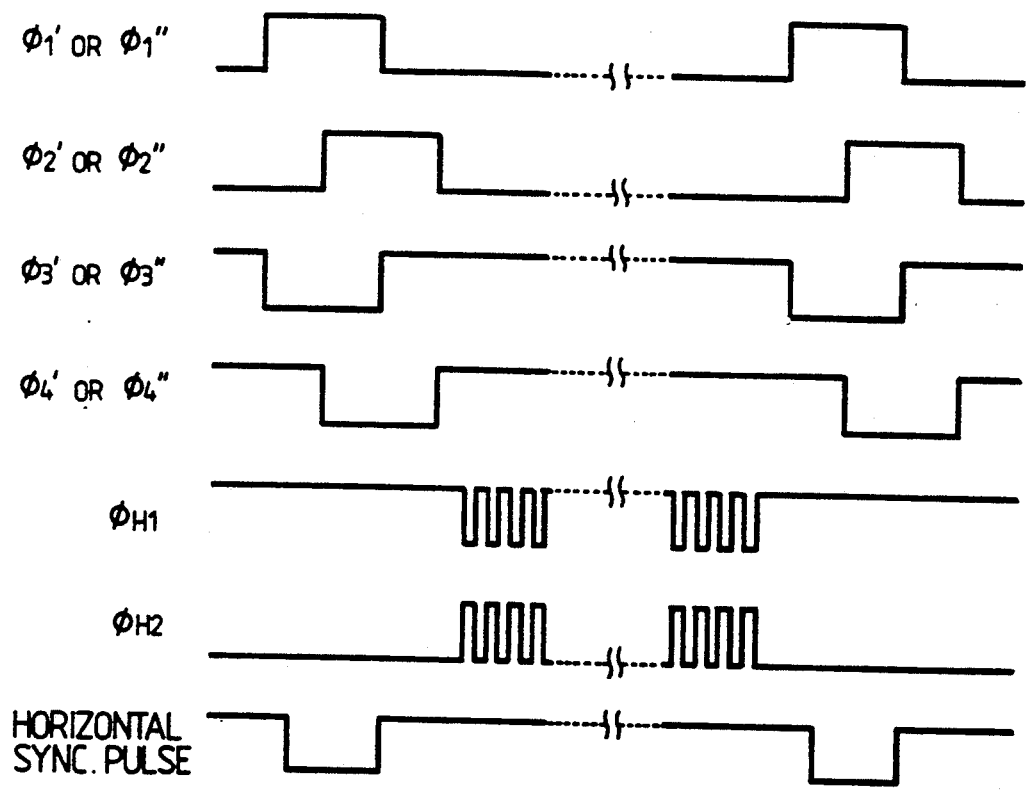

During scanning period of an odd field, a switch 41 transfers second four-phase signals from a signal generator 47 to driver 38b for transferring charges in the respective end segments of the second vertical CCDs 16 to the horizontal CCD 19 in response to the signal PG4. Then, the horizontal CCD 19 transfers received charges in the horizontal direction in response to drive signals $\phi H1, \phi H2$. Timing relationship of the above-mentioned operation is shown in FIG. 6. The signal generator 47 produces the second four-phase signals in response to a horizontal synchronous pulse H SYNC, in cooperation with inverters 45, 46. The drive signals $\phi H1, \phi H2$ are produced by an unshown signal generator. During vertical blanking period of even field none of the drive signals is produced. During scanning period of even field, a switch 43 transfers the second four-phase signals to the driver 38c in response to a field signal for transferring charges in the third vertical CCD 17 into the horizontal CCD 19, the transferred charges in the horizontal CCD 19 are further transferred in the horizontal direction in response to drive signals $\phi H1, \phi H2$. The field signal indicates an odd field by high level and an even field by low level which is generated by an unshown flip-flop circuit in response to the vertical blanking signal.

Figure 7:
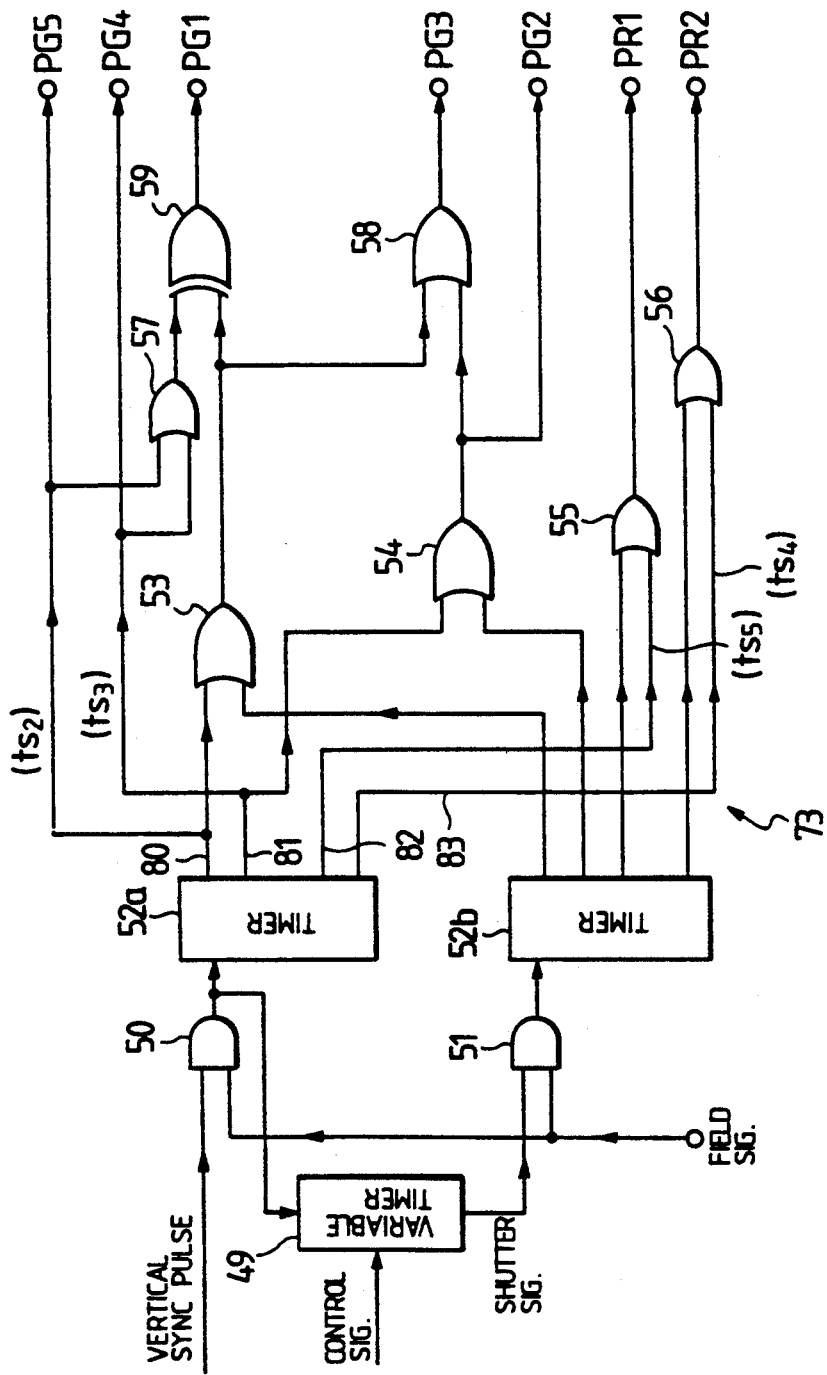
FIG. 7 is a block diagram of timing generator which controls the drive circuit of FIG. 1.
Figure 8:
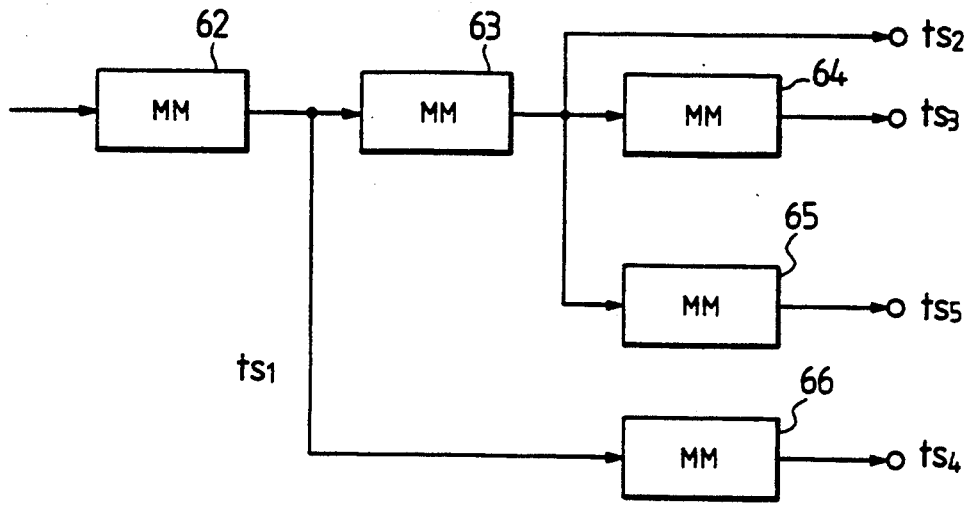
FIG. 8 is a block diagram of the timer of FIG. 7.
Figure 9:
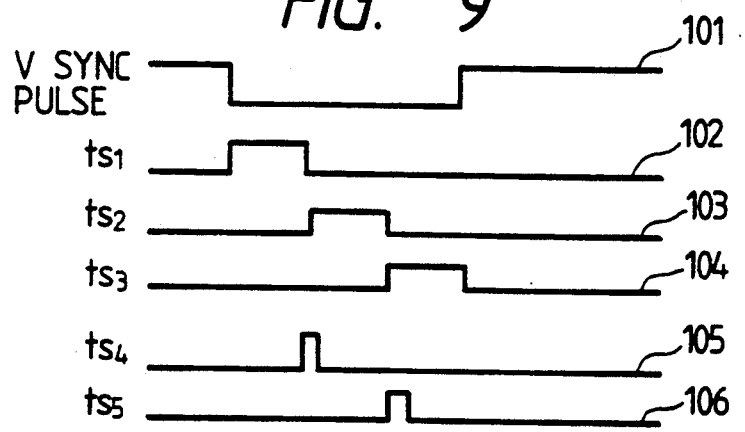
FIG. 9 shows waveforms illustrating operation of the timer of FIG. 8.
Figure 10:
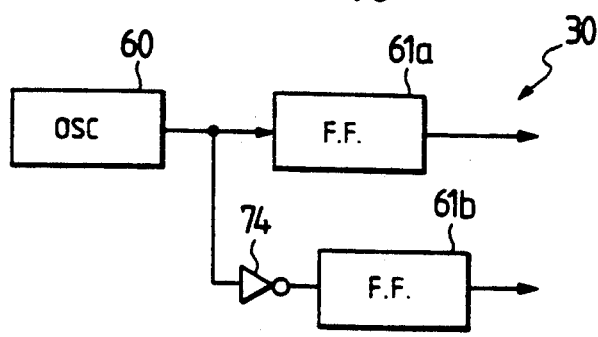
FIG. 10 is a block diagram of the signal generator of FIG. 4.
Figure 11:
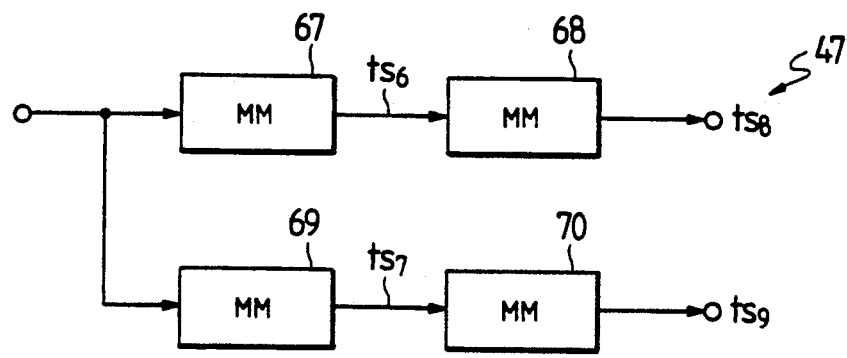
FIG. 11 is a block diagram of the signal generator 47 of FIG. 4.
Figure 12:
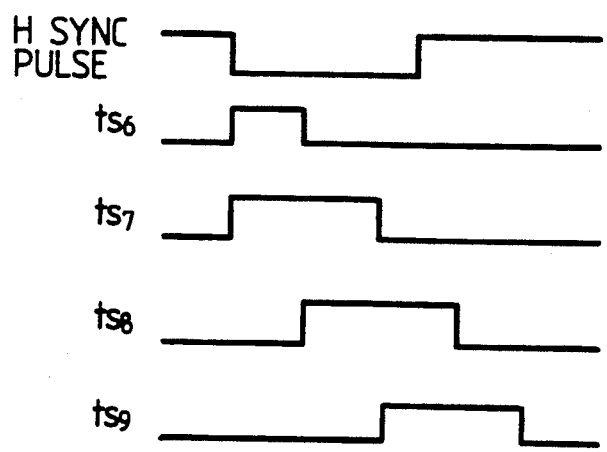
FIG. 12 shows waveforms illustrating operation of the signal generator 47 of FIG. 4.
Figure 14A:
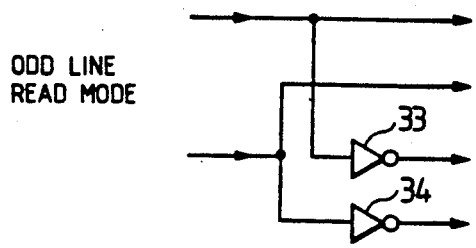
FIGS. 14A to 14D are equivalent circuit diagrams for illustrating operation of the second embodiment.
Figure 15A:
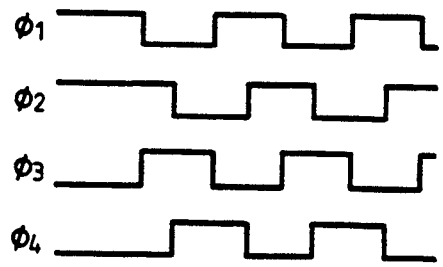
FIGS. 15A to 15D show waveforms for illustrating operation of the equivalent circuits of FIGS. 14A to 14D.
Figure 14B:
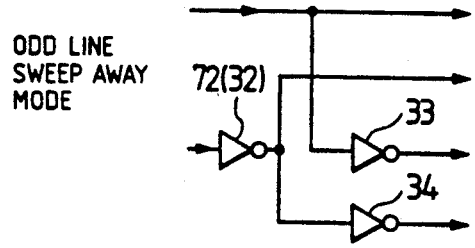
Figure 15B:
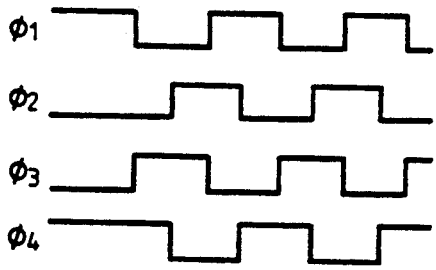
Figure 14C:
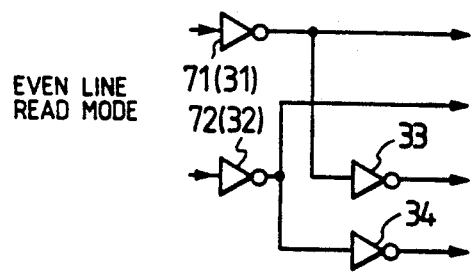
Figure 15C:
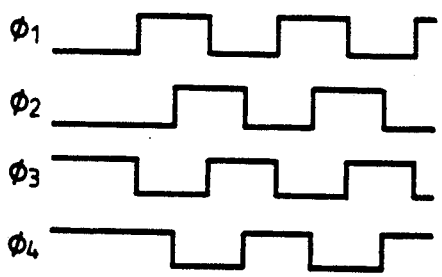
Figure 14D:
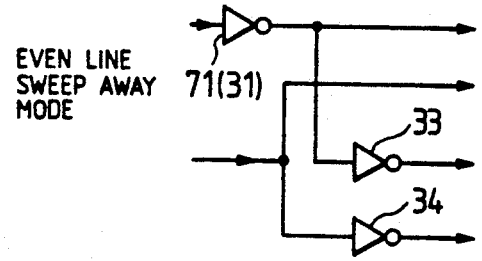
Figure 15D:
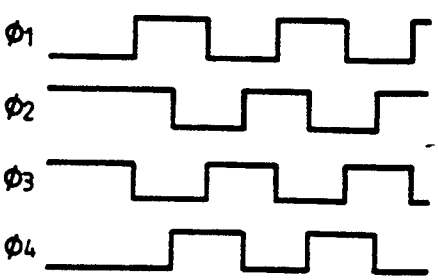
Figure 17:
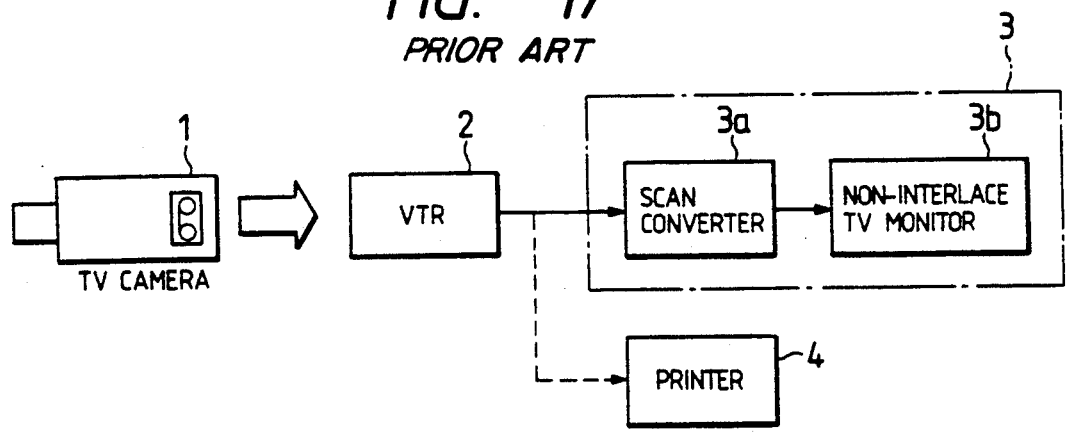
FIG. 17 is a block diagram of the television camera with still image reproduction system of the prior art.
Figure 18:
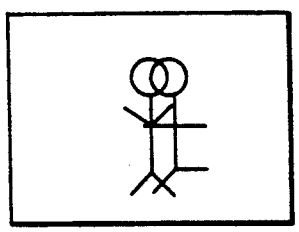
FIG. 18 is a schematic illustration illustrating double line image.

Signals PR1, PR2, PG1, PG2, PG3, PG4, and PG5 are produced by a timing signal generator 73 shown in FIG. 7. In FIG. 7, a timer 52a generates timing signals in response to a vertical synchronous pulse and a field signal through an AND gate 50. A timer 52a is shown in FIG. 8 and generates timing signals ts1 to ts5 shown in FIG. 9 by monostable multivibrator (MM) 62 to MM 66 shown in FIG. 8. The signal generator 30 has an oscillator 60, a flip-flop 61a responsive to an output of the oscillator 60, an inverter 74 responsive to the output of the oscillator 60, and a flip-flop 61b responsive to an output of the inverter 74 shown in FIG. 10, for generating the first four-phase signals. The signal generator 47 has MM 67 to MM 70 shown in FIG. 11 for generating timing signals ts6 to ts9 shown in FIG. 12 in cooperation with inverters 45, and 46. In FIG. 4, EX-OR gates 31, 32 invert signals from the signal generator 30 their output levels respectively in response to signals PG1, PG2.

As mentioned above, the drive circuit reads video signal as generated in the imaging device 11.

Hereinbelow will be described a second embodiment of the invention. The television camera of the second embodiment of the invention has a circuit arrangement of an electronic shutter in addition to that of the first embodiment. In FIG. 7, a shutter signal which is generated by a variable timer 49 responsive to a vertical synchronous pulse and the field signal through the AND gate 50, wherein setting time thereof is determined by a control signal, is applied to a timer 52b having the same circuit arrangement as the timer 52a through an AND gate 51 which is responsive to the field signal. The timer 52b produces timing signals PR1, PR2, PG1, PG2, PG3, PG4, and PG5 through OR gates 53, 54, 55, 56, and 58 and EX-OR gate 59. In FIGS. 4 and 5, at t1, signal PR1 is produced for generating gate pulse GPA by adding signal PR1 to one of four-phase signals by an adder 36. The gate pulse GPA transfers charges generated at photodiodes 13 of odd lines to the first vertical CCDs 14 at t4. At this moment, photodiodes 13 of odd lines start to store charges which will be read out during the subsequent vertical blanking period. For interval between t4 and t5, third four-phase signals which are produced by setting level of PG2 to be low; level of PG1, high, are sent to the driver 38a by opening AND gates 35a, 35b, 35c, and 35d in response to a signal PG3 and also sent to the driver 38b in response to a signal PG4 for generating drive signals $\phi1'$, $\phi2'$, $\phi3'$, $\phi4'$. These signals transfers charges in the first vertical CCDs 14 in the upwardly in the drawing, as shown in FIG. 13A into an unshown drain. At t5, signal PR2 is produced for generating gate pulse GPB by adding signal PR2 to one of four-phase signals by an adder 37. The gate pulse GPB transfers charges generated at photodiodes 13 of even lines to the first vertical CCDs 14 at t5. At this moment, photodiodes 13 of even lines start to store charges which will be read out during the subsequent vertical blanking period. For interval between t5 and t6, fourth four-phase signals which are produced by setting level of PG2 to be high; level of PG1, low, are sent to the driver 38a by opening AND gates 35a, 35b, 35c, 35d in response to a signal PG3 and also sent to the driver 38c in response to a signal PG5 for generating drive signals $\phi1''$, $\phi2''$, $\phi3''$, $\phi4''$. These signals transfer charges in the first vertical CCDs 14 in the upward direction of the drawing as shown in FIG. 13B, to sweep out charges into the unshown drain. Four-phase signals corresponding to the drive signals $\phi1$, $\phi2$, $\phi3$, $\phi4$ are generated in accordance with combination of levels of the signals PG1 and PG2. FIGS. 14A to 14D shows circuits equivalent to a circuit arrangement including inverters 33, 34 and EX-OR gates 31, 32 of FIG. 4, wherein arrangements of the equivalent circuits change in accordance with the combination of the signals PG1, PG2. In FIGS. 14A to 14D, inverters 71 and 72 correspond to the EX-OR gates 31 and 32 respectively. Four-phase signals generated by the equivalent circuit arrangements of FIGS. 14A to 14D generate the drive signals $\phi1$, $\phi2$, $\phi3$, $\phi4$ respectively.

As mentioned above, unnecessary charges are transferred to the first vertical CCDs 14 at t4 or t5 then to the drain. Then, the photodiodes 13 begin to store necessary charges until a next vertical synchronous pulse occurs. This interval is exposure time, as shown in FIG. 5. The exposure time is determined by setting time of the variable timer 49. In other words, the exposure time is controllable from 1/30 sec minus setting time on the variable timer 49) up to 1/30 seconds as the maximum. Therefore, the television camera of the second embodiment can take a picture image of the object moving rapidly without blurring.

According to the invention, picture smearing is reduced. The reasons are as follows:

In the conventional interline CCD, signal charges are transferred in vertical CCDs at a slow speed. During transferring the charges in the vertical CCDs, charges being stored at photodiodes leak and enter into the vertical CCDs. On the other hand, in the television camera according to the invention, charges in the first vertical CCDs 14 are transferred at a high speed so that amount of charges at photodiodes 13 leaking and entering into the first vertical CCDs 14 is limited small. Therefore, smearing is reduced in the television according to the invention.

What is claimed is:

1. A television camera comprising:
   a CCD imaging device having:
   (a) matrix photoelectric conversion elements for producing charges in response to incident light;
   (b) columns of first vertical CCDs arranged in the main scanning direction for receiving said charges from said photoelectric conversion elements and for transferring said charges in response to a first signal;
   (c) transfer means for transferring charges from horizontal odd lines of said photoelectric conversion elements to said first vertical CCDs in response to a second signal and for transferring charges from horizontal even lines of said photoelectric conversion elements to said first vertical CCDs in response to a third signal;
   (d) a double line CCD section arranged at one end of each of said columns of first vertical CCDs, including:
   (I) a second vertical CCD, responsive to a fourth signal for receiving, storing and transferring said charges fed from said horizontal odd lines of said photoelectric conversion elements via said first vertical CCD; and
   (II) a third vertical CCD, responsive to a fifth signal for receiving, storing and transferring said charges fed from said horizontal even lines of said photoelectric conversion elements via said first vertical CCD; and
   (e) a horizontal CCD arranged at one end of said second and third vertical CCDs for receiving said charges stored in said second and third vertical CCDs alternately and for outputting said charges sequentially in response to a horizontal blanking signal; and
   a drive circuit for repeatedly generating said first, second, third, fourth, and fifth signals, such that said second signal is generated in response to a vertical blanking signal; then said first and fourth signals are generated at the same time; then said third signal is generated; and then said first and fifth signals are generated at the same time.

2. A television camera according to claim 1, wherein each column of said first vertical CCDs is connected to said second and third vertical CCDs respectively in such that the lower end segment of each column of said first vertical CCDs has first and second bottom edges directly coupled to respective tops of the upper end segments of the second and third vertical CCDs.

3. A television camera according to claim 1, further comprising:
   frame detection means for detecting a frame and for producing a frame signal in response to said vertical blanking signal;
   a variable delay timer responsive to said frame signal and to an external control signal for generating a timing signal, the delay time of said variable delay timer being determined by said external control signal to be shorter than an interval of said frame signal, said timing signal thereby dividing said interval of said frame signal into exposing and shading periods; and sweep away means responsive to said timing signal for sweeping away said charges of said odd lines generated for said shading period by generating said second and first signals and for sweeping away said charges of said even lines generated for said shading period by generating said third and first signals; and wherein said charges of said odd and even lines generated by said photoelectric conversion elements for said exposing period are received by said double line CCD section during said shading period.

4. A television camera according to claim 3, wherein said sweep away means comprises:

a phase variation means for changing a phase relationship between four-phase signals of said first signal in response to said timing signal so that charges in said first vertical CCDs move in the direction opposite to said storing section; and wherein said drive circuit generates said first, second, third, fourth, and fifth signals in response to said timing signal.

* * * * *